(12) United States Patent
Crammond

(10) Patent No.: US 10,576,365 B1
(45) Date of Patent: Mar. 3, 2020

(54) EDUCATION, LOGIC, AND PUZZLE SYSTEMS, METHODS, AND TECHNIQUES

(71) Applicant: GJC IP Holdings Ltd., Watford (GB)

(72) Inventor: Geoffrey J. Crammond, Hertfordshire (GB)

(73) Assignee: GJC IP Holdings Ltd., Watford (GB)

( * ) Notice: Subject to any disclaimer, the term of this patent is extended or adjusted under 35 U.S.C. 154(b) by 309 days.

(21) Appl. No.: 15/614,812

(22) Filed: Jun. 6, 2017

Related U.S. Application Data

(63) Continuation-in-part of application No. 15/210,148, filed on Jul. 14, 2016, now abandoned.

(60) Provisional application No. 62/345,038, filed on Jun. 3, 2016.

(51) Int. Cl.
| | | |
|---|---|---|
| *G09B 17/00* | (2006.01) | |
| *A63F 3/04* | (2006.01) | |
| *G09B 5/00* | (2006.01) | |
| *G09B 19/22* | (2006.01) | |
| *A63F 9/00* | (2006.01) | |
| *A63F 13/822* | (2014.01) | |
| *A63F 13/46* | (2014.01) | |

(52) U.S. Cl.
CPC .......... *A63F 3/0423* (2013.01); *A63F 9/0098* (2013.01); *A63F 13/46* (2014.09); *A63F 13/822* (2014.09); *G09B 5/00* (2013.01); *G09B 17/003* (2013.01); *G09B 19/22* (2013.01); *A63F 2003/0426* (2013.01)

(58) Field of Classification Search
USPC ....... 434/128, 156, 167, 169, 171, 172, 174, 434/176, 177; 273/153 R, 288, 289
See application file for complete search history.

(56) References Cited

U.S. PATENT DOCUMENTS

| | | | | |
|---|---|---|---|---|
| 5,282,631 A | * | 2/1994 | Baker | A63F 3/0423 273/153 R |
| 5,288,068 A | * | 2/1994 | Roth | A63F 3/0423 273/153 R |
| 5,566,942 A | * | 10/1996 | Elum | A63F 3/0423 273/153 R |
| 6,378,867 B1 | * | 4/2002 | Shalless | A63F 3/0421 273/153 R |
| 7,000,919 B2 | * | 2/2006 | LiDonnici | A63F 3/0423 273/153 R |

(Continued)

*Primary Examiner* — Kurt Fernstrom
(74) *Attorney, Agent, or Firm* — Banner & Witcoff, Ltd.

(57) ABSTRACT

New and unique puzzle mechanics, systems, and methods are described herein. A puzzle grid comprising linearly arranged intersecting words, with each individual letter placed on a separate puzzle tile, may be divided into a plurality of puzzle pieces, where each puzzle piece is formed of one or more contiguous puzzle tiles. Each puzzle piece shape conforms to one of a predefined set of shapes. To mix up the puzzle grid, identically shaped puzzle pieces may be randomly shuffled and rotated if required so that the puzzle layout remains unchanged whereas the letters are scrambled. Also puzzle pieces whose shape exhibit rotational symmetry may be optionally rotated within the puzzle layout. Letters may maintain upright legibility. A user may then attempt to solve the puzzle by swapping identically shaped puzzle pieces and optionally rotating puzzle pieces whose shape exhibit rotational symmetry.

21 Claims, 15 Drawing Sheets
(8 of 15 Drawing Sheet(s) Filed in Color)

(56) References Cited

U.S. PATENT DOCUMENTS

| | | | | |
|---|---|---|---|---|
| 7,125,255 | B2 * | 10/2006 | Queen | A63F 9/12 |
| | | | | 434/156 |
| 7,591,469 | B2 * | 9/2009 | Dowe | A63F 3/0423 |
| | | | | 273/272 |
| 7,618,313 | B2 * | 11/2009 | Ghaly | A63F 3/0421 |
| | | | | 434/272 |
| 8,308,539 | B1 * | 11/2012 | Cleghorn | A63F 3/0423 |
| | | | | 434/159 |
| 8,567,787 | B1 * | 10/2013 | Chang | A63F 1/00 |
| | | | | 273/299 |
| 9,937,410 | B2 * | 4/2018 | Greenawalt | A63F 3/00574 |
| 2009/0275372 | A1 * | 11/2009 | Prucey | A63F 9/10 |
| | | | | 463/9 |
| 2010/0156045 | A1 * | 6/2010 | Kahn | A63F 3/0423 |
| | | | | 273/153 R |

* cited by examiner

| A | R | I | D |   |   |   |   |
|---|---|---|---|---|---|---|---|
| P |   | I |   |   |   |   |   |
| P | A | I | N | F | U | L | L | Y |
| L |   | E |   |   |   | I |   | I |
| E | A | R | D | R | U | M |   | E |
|   |   | A |   |   |   | I |   | L |
| S | T | R | U | T | T | E | D |   |

| R | E | U | L |   |   |   |   |   |
| D |   | E |   |   |   |   |   |   |
| R | R | F | N | I | I | D | L | D |
| I |   | I |   |   |   | R |   | E |
| Y | L | A | P | P | A | T |   | A |
|   |   | U |   |   |   | S |   | A |
| I | M | U | T | T | L | E |   |   |

1706

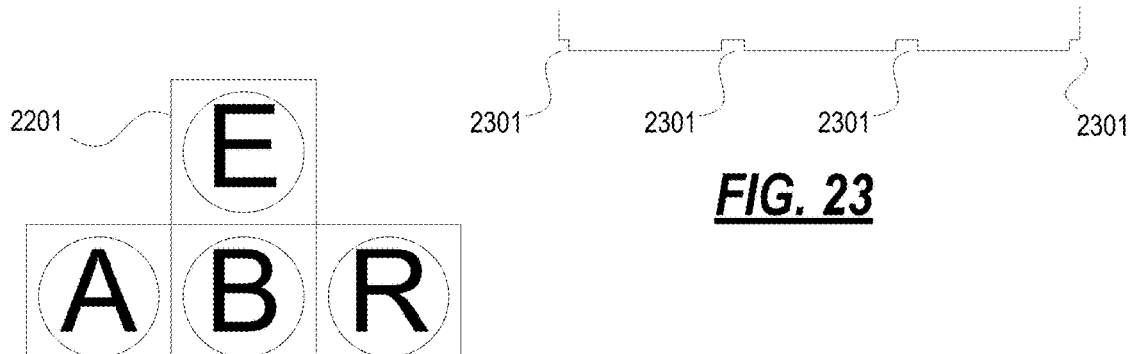
*FIG. 22*
*FIG. 23*
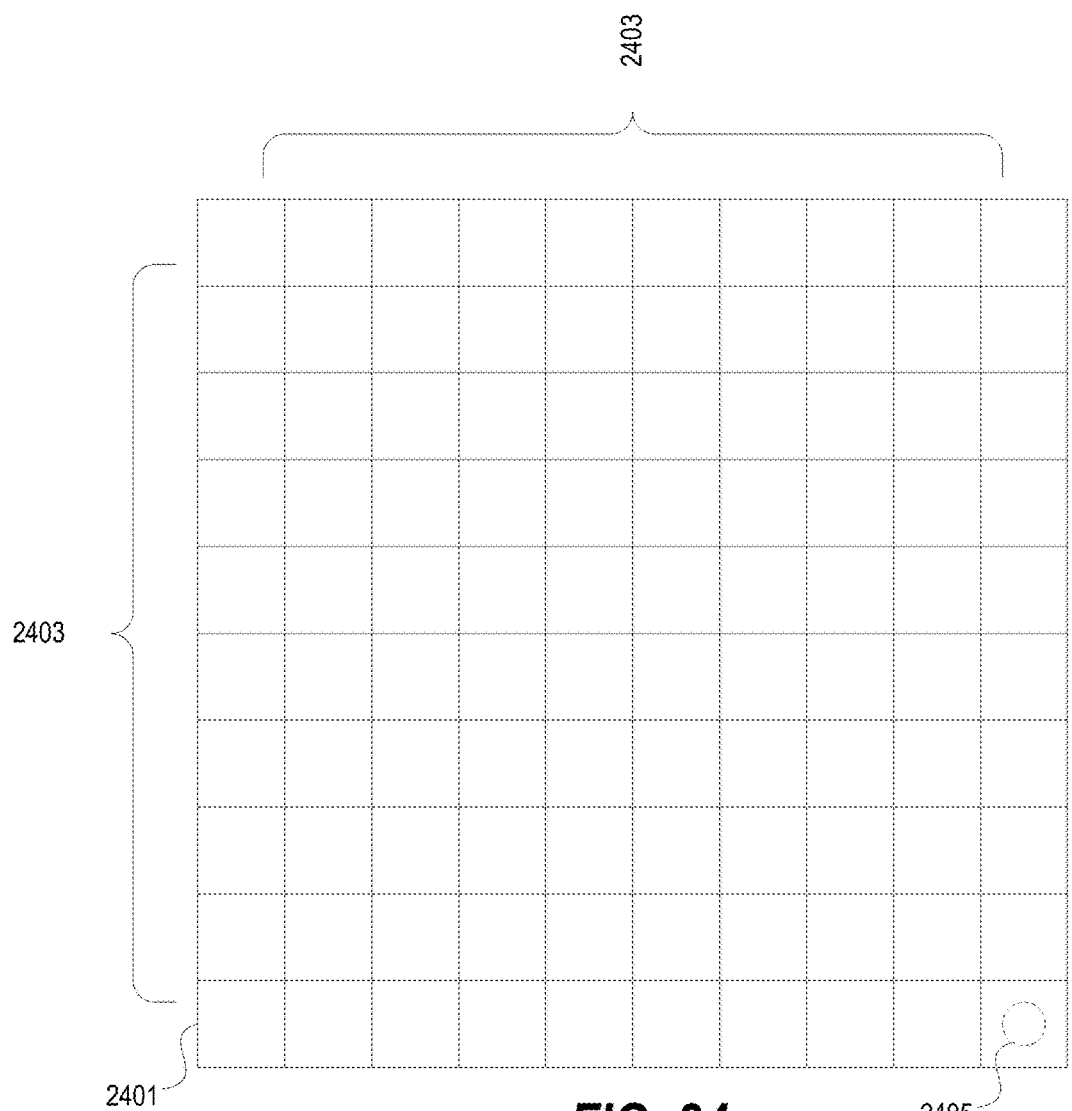
*FIG. 24*

EDUCATION, LOGIC, AND PUZZLE SYSTEMS, METHODS, AND TECHNIQUES

CROSS REFERENCE TO RELATED APPLICATIONS

This application is a continuation-in-part of U.S. application Ser. No. 15/210,148, filed Jul. 14, 2016, entitled "Education, Logic, and Puzzle Systems, Methods, and Techniques," which in turn claims priority to provisional application No. 62/345,038, filed Jun. 3, 2016, entitled "Word Game" to Geoffrey J. Crammond, each of which is herein incorporated by reference in its entirety for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein generally relate to brain training, educational exercises and word puzzles. More specifically, aspects provide new physical, virtual, and/or electronic boards, pieces, mechanics, heuristics, rules, techniques, methods, and systems involving logic, spelling, visualization, and movement of letters or other characters to form words or other discrete constructs.

BACKGROUND

Puzzles not only provide entertainment, but also serve as teaching tools and educational devices. Brain teaser type puzzles, and word puzzles in particular, help educate and improve one's spelling, logic analysis, problem solving skills, reading comprehension, and general knowledge. New and innovative techniques are difficult to create, and are in constant demand.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to new and unique puzzle mechanics, systems, and methods. As a brief introduction, a puzzle grid comprising linearly arranged intersecting words, with each individual letter placed on a separate puzzle tile, may be divided into a plurality of puzzle pieces, where each puzzle piece is formed of one or more puzzle tiles and whose shape conforms to one of a predefined set of puzzle piece shapes such that the puzzle's pieces by their position and orientation define the puzzle layout. Identically shaped puzzle pieces may be randomly shuffled within the puzzle layout to mix up the puzzle grid. This may require that pieces are rotated in order to conform to the puzzle layout. In addition pieces whose shape exhibit rotational symmetry may be optionally rotated to such orientations that the shape outline appears unchanged by the rotation to increase difficulty while maintaining conformity to the puzzle layout. A user may then attempt to solve the puzzle by swapping identically shaped puzzle pieces and optionally rotating puzzle pieces whose shape exhibit rotational symmetry. In one variation, each puzzle tile is square and each puzzle piece is comprised of one or more contiguously arranged square tiles. A hint feature may highlight all the letters in a single word regardless of where their corresponding tiles are presently located. A progress affirmation feature may distinguish and lock in place correctly placed puzzle tiles and/or pieces which correctly bear a solution puzzle word.

According to a first illustrative aspect, methods, systems, and specially configured software and/or computers may be configured to identify a solution grid for a field of play, where the solution grid is made up of words; divide the solution grid into pieces, each piece conforming to one in a set of predefined piece shapes. Each piece shape may be made up of one or more tiles, where each tile contains one letter, and where at least some of the words span across more than one piece. A set of locations corresponding to each piece shape is identified, then the solution grid is randomized by shuffling identically shaped pieces among the set of locations corresponding to that piece shape. Pieces may then be swapped responsive to user input in an attempt to recreate the solution grid.

In some embodiments, optionally, randomizing the solution grid may also include rotating one or more multi-tile pieces whose shape exhibit rotational symmetry such that the shape outline appears unchanged by the rotation. Then such pieces may be rotated responsive to user input while recreating the solution grid.

In some embodiments, each tile is square, and the predefined set of different piece shapes consists of a 1-tile square, a 2-tile rectangle, a 3-tile rectangle, a 3-tile al, a 4-tile pyramid, and a 5-tile plus sign.

Some embodiments may include an affirmation feature that identifies, responsive to user input (or automatically), at least correctly placed tiles upon which a solution puzzle word has been correctly recreated. In some variations, correctly placed pieces may be locked in place.

In another illustrative embodiment, a system may include a plurality of tiles, where each tile represents a subset of a concept, and a plurality of different puzzle pieces each configured in one of a predefined number of different piece shapes, where each different piece shape has one or more contiguous tiles, a plurality of different piece shapes comprise two or more tiles, and multiple pieces of the plurality of different piece shapes that comprise two or more tiles include at least two different tiles. The system may include a field of play in which the puzzle pieces may be arranged to form complete concepts using the puzzle pieces, wherein at least some of the complete concepts span multiple puzzle pieces when the puzzle is solved.

In some embodiments, the system may include a processor and memory storing computer readable instructions that, when executed by the processor, configure the system to identify a solution grid for the field of play; divide the solution grid into pieces conforming to the predefined number of different piece shapes; randomize the solution grid by shuffling a plurality of identically shaped pieces to a different location occupied by any identically shaped piece; and move pieces responsive to user input.

In other embodiments of the system each tile may include a base portion and a table portion, where the table portion is concentrically attachable to the base portion and displays the represented subset of the concept. The table portion may be rotatable about the base portion to display the subset of the concept in substantially any direction on a two dimensional plane.

In some embodiments each complete concept is a different word and each tile represents a letter. In other embodiments each concept may be an image and each tile represents a portion of the image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of aspects described herein and the advantages thereof may be acquired by referring to the following description in consideration of the accompanying drawings, in which like reference numbers indicate like features, and wherein:

FIG. 17A-17F illustrates iterations of a puzzle grid during the creation process of FIG. 15.

FIG. 22 illustrates a top view of a 4-tile pyramid physical tile according to one or more illustrative aspects described herein.

FIG. 23 illustrates a partial side view of a physical multi-tile according to one or more illustrative aspects described herein.

FIG. 24 illustrates a puzzle board according to one or more illustrative aspects described herein.

These and other features are described in more detail below.

DETAILED DESCRIPTION

In the following description of the various embodiments, reference is made to the drawings, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. For example, one or more aspects may be embodied in a physical device or puzzle, or may be implemented as a video game, software, or via a virtual reality or augmented reality device.

Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
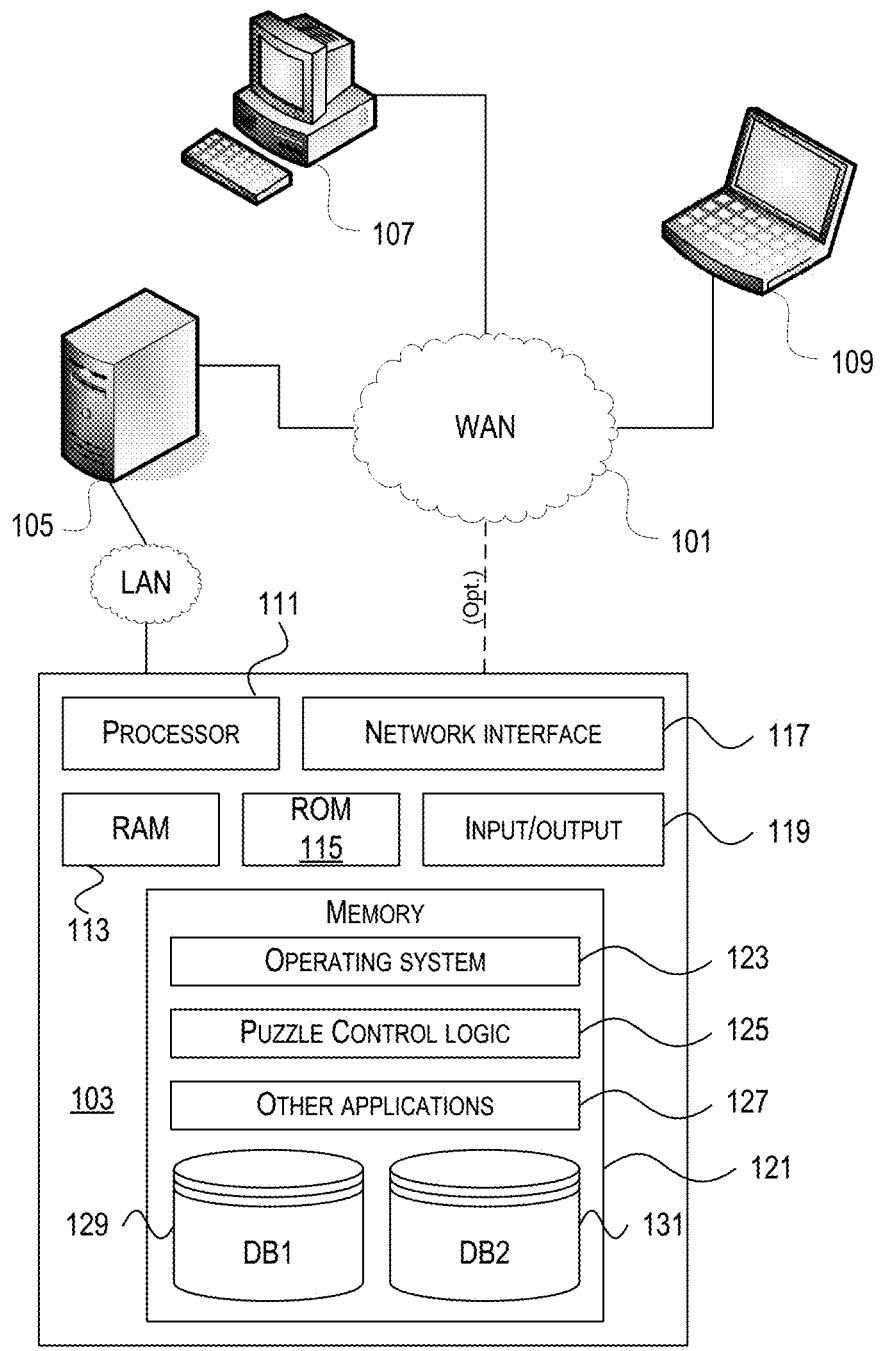
FIG. 1 illustrates one example of a network architecture and data processing device that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 (e.g., a word dictionary, solution grid database, image database, or the like) and a second database 131 (e.g., to track user/game status, level progression, etc.). In some embodiments, the first database may include the second database (e.g., as a separate table, report, subsystem, etc.).

That is, the information can be stored in a single database, or separated into different logical, virtual, or physical databases, depending on system design. Additional databases may also be used as needed. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

One or more aspects described herein provide an educational tool for improving one's logic, reasoning, spelling, spatial visualization, object orientation, general knowledge, intelligence, and/or reading comprehension abilities. Initial illustrative aspects are described as may be embodied in a word game, where each puzzle "tile" displays a single letter, number or character (in other embodiments, each tile may contain a portion of an image). Each puzzle tile is preferably of uniform shape, although different embodiments may use differently shaped tiles, e.g., triangles, squares, hexagons, etc. Each puzzle "piece" comprises one or more connected or contiguous tiles.

Figure 10:
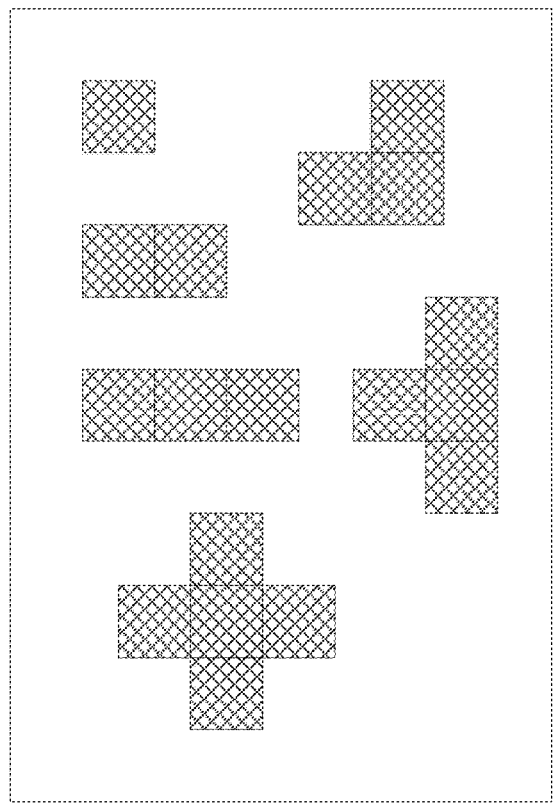
FIG. 10 illustrates square-based puzzle pieces according to one or more illustrative aspects described herein.
Figure 11:
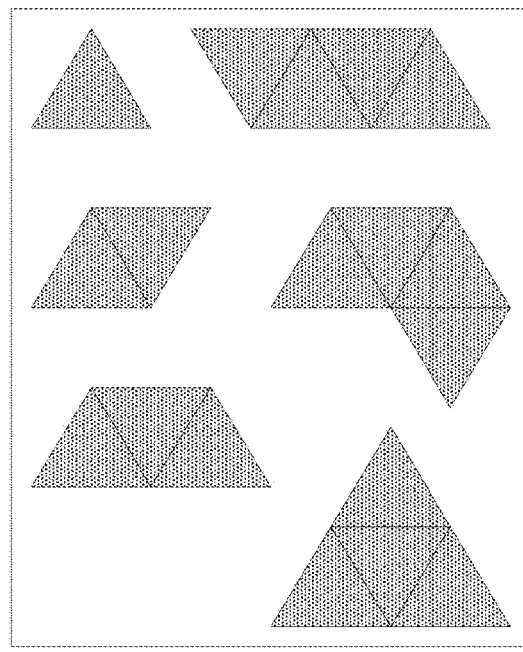
FIG. 11 illustrates triangle-based puzzle pieces according to one or more illustrative aspects described herein.
Figure 12:
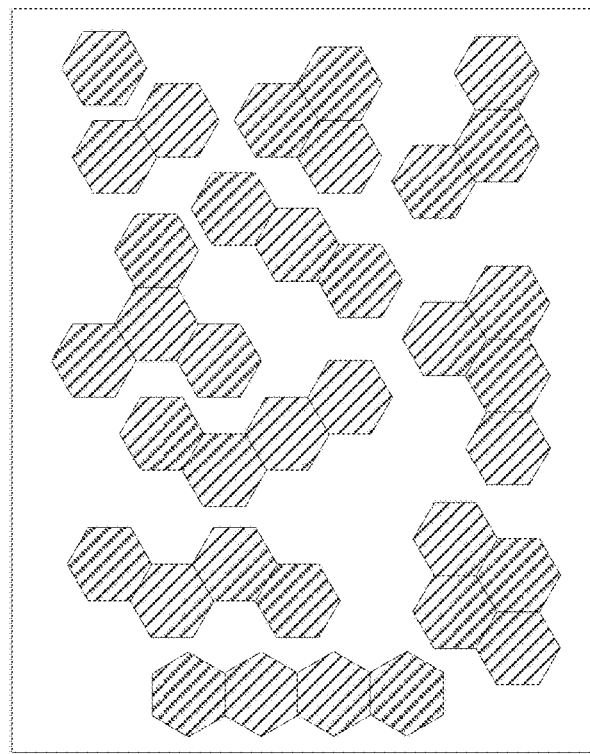
FIG. 12 illustrates hexagon-based puzzle pieces according to one or more illustrative aspects described herein.

Puzzle pieces may have predefined shapes, or alternatively shapes may be generated based on the number of tiles in each piece. In one embodiment puzzle piece shapes may be based on variously shaped polyominos (plane geometric figures formed by joining one or more equal squares edge to edge). For example, FIG. 10 illustrates puzzle pieces that may be used based on a square tile. In another embodiment, one or more polyiamonds (formed of equilateral triangles) may be used, a subset of which is illustrated in FIG. 11. In still another embodiment, one or more polyhexes (formed of regular hexagons) may be used, a subset of which is illustrated in FIG. 12. The puzzle pieces in FIGS. 10-12 are not limiting. Additional pieces may be used comprised of more or different puzzle tiles than depicted in FIGS. 10-12. Any set or subset of polyominos, polyiamonds, polyhexes, and/or any other plane polyform may be used.

Figure 13:
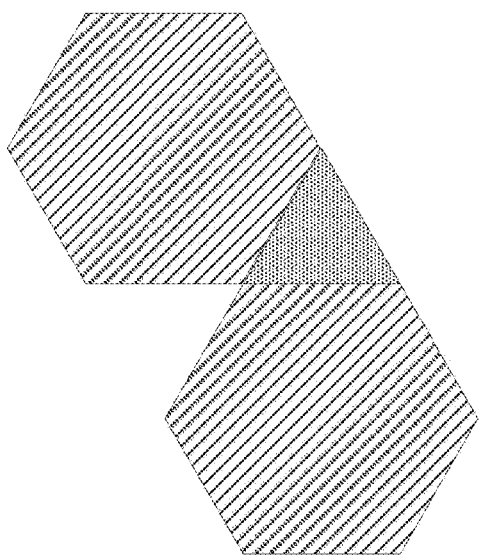
FIG. 13 illustrates a puzzle piece comprised of non-uniformly shaped tiles according to one or more illustrative aspects described herein.

While the use of square puzzle tiles has been tested and known to work well with users, other puzzle tiles and/or pieces may alternatively be used. In yet other embodiments, puzzle pieces might not be comprised of uniformly shaped tiles. That is, tile shapes may be mixed within a puzzle piece, e.g., as shown in FIG. 13. Provided that puzzle tiles within a piece have at least one side in common with a neighboring tile, different shaped tiles can be used within a given piece. Similarly, as long as puzzle pieces can be arranged such that puzzle pieces have a side in common with neighboring puzzle pieces, differently shaped or sized puzzle pieces can be used within the same puzzle grid.

Figure 2:
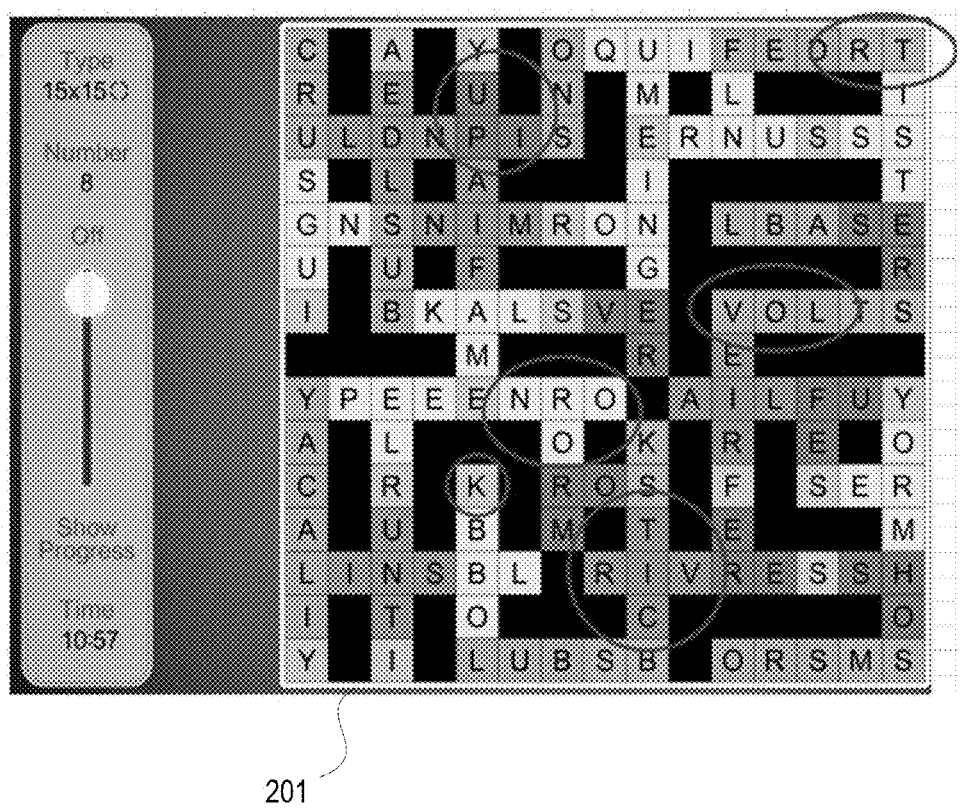
FIG. 2 illustrates a sample field of play according to one or more illustrative aspects described herein.
Figure 9:
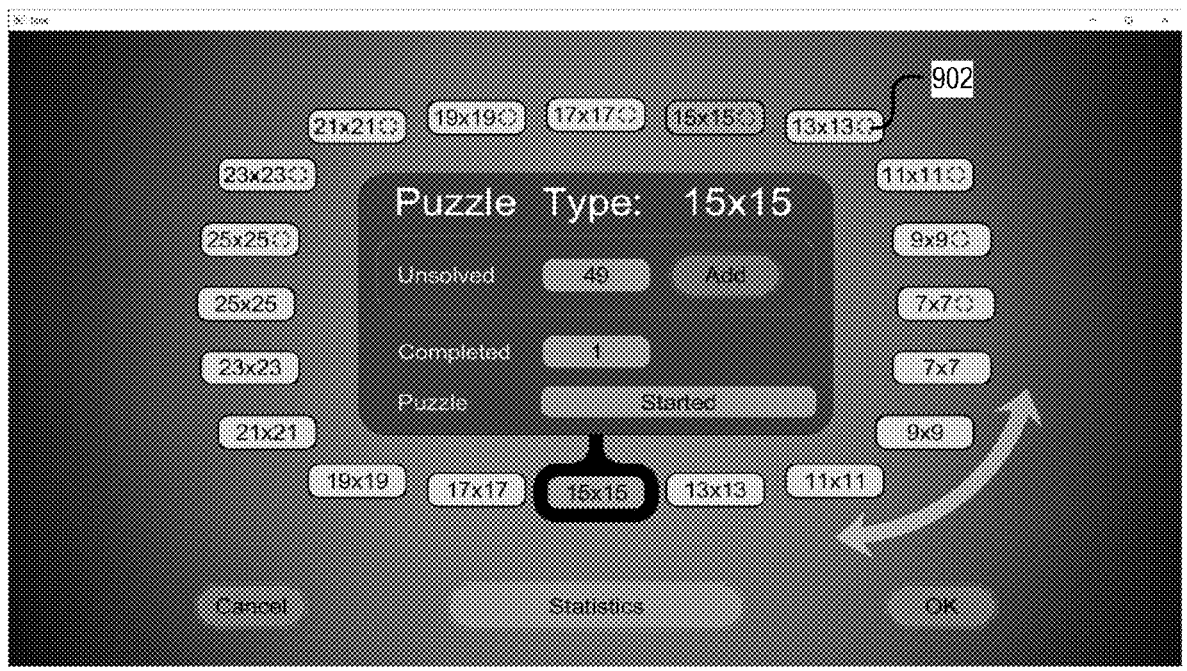
FIG. 9 illustrates a grid selection screen according to one or more illustrative aspects described herein.

In a first illustrative embodiment, as shown in FIG. 2, each puzzle grid may be comprised of rows and columns of square puzzle tiles as formed by puzzle pieces. The puzzle in FIG. 2 illustrates a 15×15 puzzle grid 201. However, grids of other sizes may be used, e.g., as small as 2×2 or 3×3 and up to 25×25 or more. A sample grid selection screen is shown in FIG. 9. An indicator 902 (e.g., four arrows in a circle) may optionally be used to indicate whether an internal rotation feature (described below with respect to FIG. 4) is available in each grid. Each puzzle grid need not be square. Rectangular puzzle grids may also be used. When puzzle tiles are other than squares, puzzle grids may conform to shapes suitable to or based on the puzzle tile shape. For example, triangular tiles may result in triangular, diamond, quadrilateral, and/or hexagonal shaped puzzles. Other shaped tiles may result in these or other shaped puzzles. Puzzles may also be shaped to represent or resemble other objects. Each puzzle may be solid, e.g., where every possible tile location has a tile placed thereon without any gaps, or a puzzle may contain spaces or gaps. The puzzle grids illustrated in FIGS. 2-6 include such spaces or gaps, but such representation is not intended to be limiting.

Figure 14:
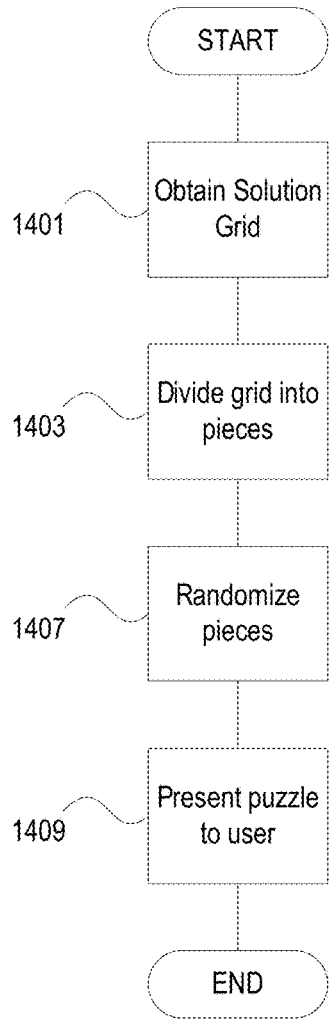
FIG. 14 illustrates a method of puzzle grid creation according to one or more illustrative aspects described herein.

With reference to FIG. 14, each puzzle may be constructed by arranging letters in a crossword style grid of intersecting words in the solution position. Initially, in step 1401, a puzzle grid having a known solution is obtained, also referred to herein as a solution grid. The solution grid may be identified, generated, queried, or otherwise obtained in any desired manner. The manner of selection or creation is secondary to obtaining a solution grid matching the desired puzzle criteria, e.g., size/shape of grid, subject matter, language, etc.

Figure 15:
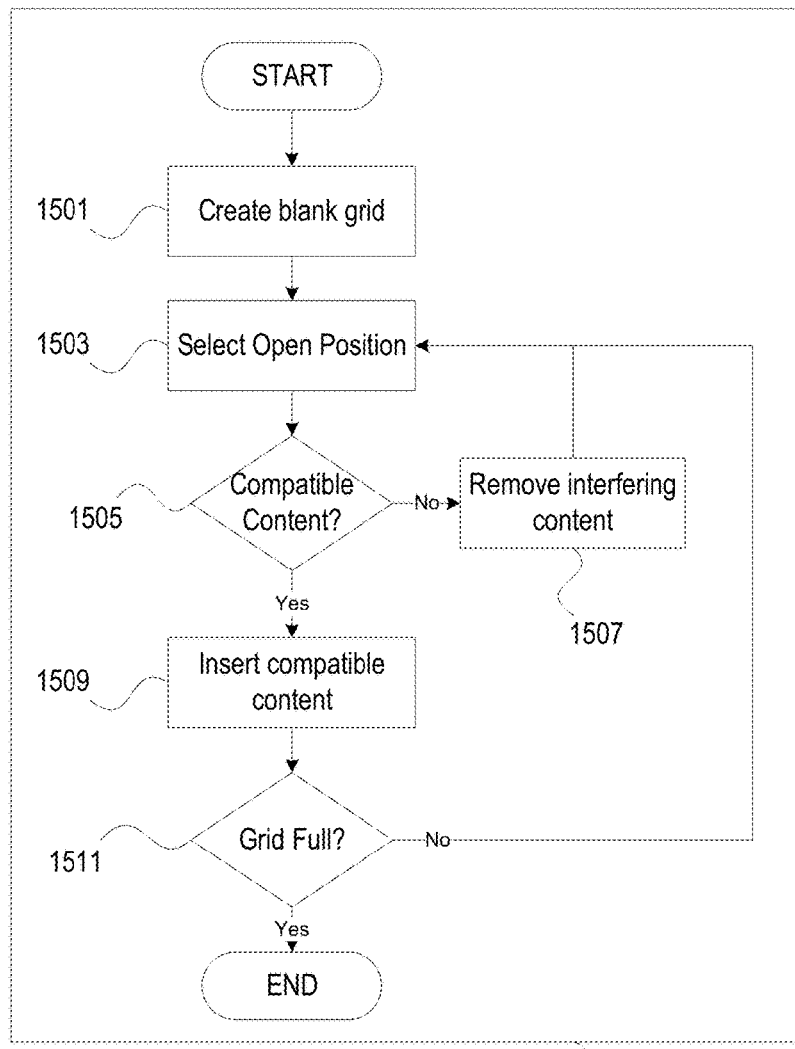
FIG. 15 illustrates a method of generating a solution grid according to one or more illustrative aspects described herein.
Figure 17A:
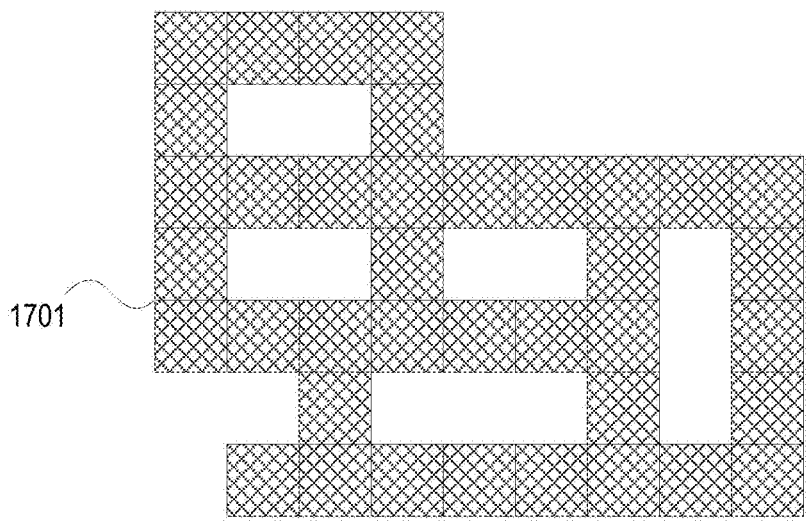

For example, with further reference to FIG. 17, FIG. 15 illustrates one possible method for performing step 1401. Initially, in step 1501, a puzzle generator (e.g., a software function or module specifically programmed to create a puzzle grid based on a determined or selected grid size) creates a blank puzzle grid 1701, e.g., as shown in FIG. 17A. The grid size may be based on a user selection of grid size and/or shape, or may be based on a user's progression or level within a predefined hierarchy, map or other puzzle progression structure. Example grid 1701 includes spaces for one 3-letter word, one 4-letter word, four 5-letter words, one 7-letter word, one 8-letter word, and one 9-letter word. The grid shown in FIG. 17 is nonconforming to a traditional or conventional crossword style grid as an example that grids can be any desired shape or size. In some embodiments, solution grids might conform to a more conventional American-style crossword grid (e.g., including multidimensional blocks of spaces to be completed), British/South African lattice style grid (e.g., as shown in FIGS. 2-6), fill-in crossword (e.g., in an embodiment where scrambled pieces are not initially placed within the puzzle grid), barred crossword grid (e.g., where bold bars are used instead of shaded blocks to denote separation between words), or any other style grids. In addition grids may be symmetrical or asymmetrical, square, rectangular, uniform, or irregular in shape, and/or may be shaped like a known object (e.g., tree, train, car, castle, etc.).

Figure 17B:
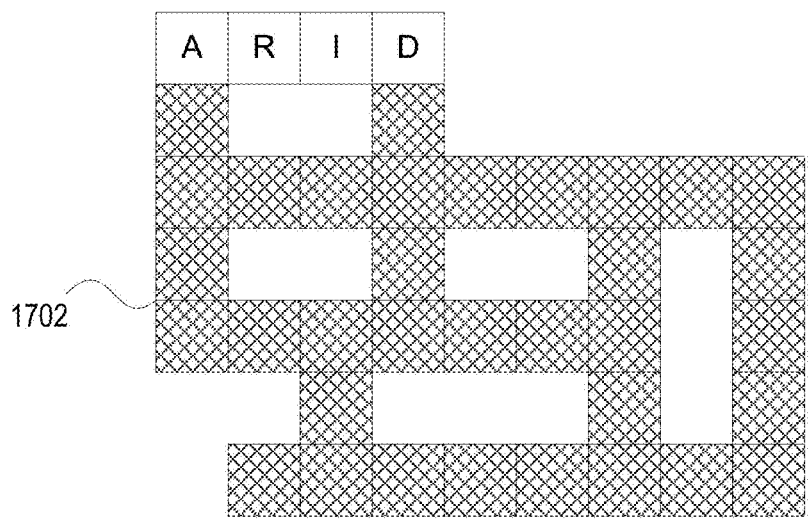
Figure 17C:
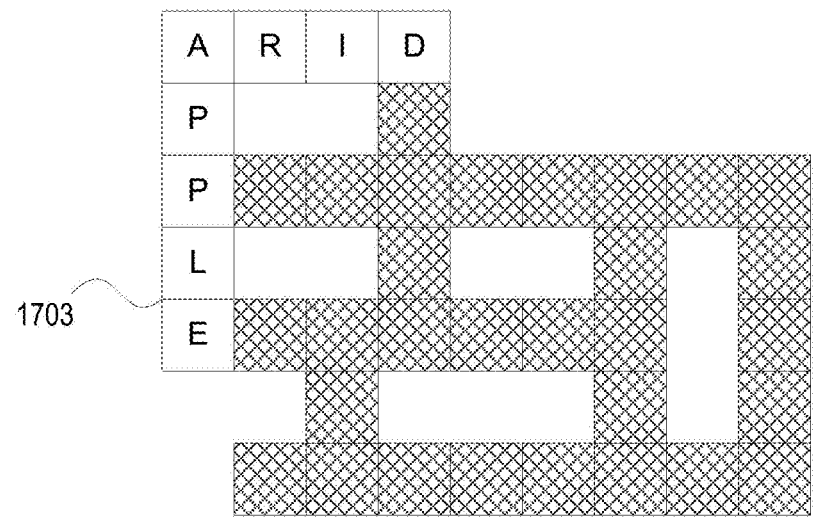

Next, the puzzle generator iterates through steps 1503-1511 until the grill is filled in. In step 1503, the grid generator identifies an open grid position to place a word. In step 1505 the puzzle generator determines whether there is compatible content (in this example, a compatible word) for the selected position. That is, if this is the first word being placed, then the puzzle generator queries a dictionary for any word matching the length of the open grid position, and places the word into the grid 1702 at the identified open grid position, as shown in FIG. 17B. If this is not the first word being placed, then it is possible that the open grid position already contains one or more letters based on previously placed words. In such a case, the puzzle generator queries the dictionary for a word matching the open position length, and having the preexisting letter(s) in the appropriate corresponding position(s), e.g., as shown in grid 1703 in FIG. 17C. If compatible content is not found, then in step 1507 the puzzle generator removes the word corresponding to the preexisting letter(s), and returns back to step 1503. Thus, if at any step a suitable word cannot be found, the puzzle generator may remove the word causing the preexisting letter in order to be able to try a different suitable word in its place. Alternatively, according to an illustrative aspect, the puzzle generator may create the blank grid layout (1501) adaptively during steps 1503-1511. That is, a blank grid layout might not be created in advance of placement of the words or other content. Rather, the grid layout may be created iteratively during steps 1503-1511.

If a compatible word is found in step 1505, then in step 1509 the puzzle generator inserts the compatible word into the puzzle grid. In step 1511 the puzzle generator determines whether the puzzle grid is full such that it represents a complete solution grid. If the puzzle grid is not full, then the puzzle grid returns to step 1503 where steps 1503-1511 iterate until the puzzle grid is full. Once full, e.g., as shown in grid 1704 in FIG. 17D, the puzzle generator may proceed to step 1403.

When selecting words, the puzzle generator may use any predefined dictionary, e.g., some or all words in a given language (e.g., English, French, German, Russian, Chinese, etc.), alphabet (e.g., Latin, Greek, Cyrillic, Armenian, Georgian, Arabic, Hebrew, Hanzi, Kana, Hangul, Chinese, Japanese, etc.), words fitting a predefined theme or subject matter (e.g., geography, sports, culture, religion, educational subject, etc.), numbers, non-mathematical symbols, mathematical symbols, mathematical operator symbols, leet (1337) speak, or words matching any predefined criteria of the puzzle designer or selected by a player. In still other embodiments, each tile may contain a portion of a picture or image to be arranged and completed by a user, similar to a jigsaw puzzle whose pieces are shaped, arranged and limited as described herein.

Figure 16:
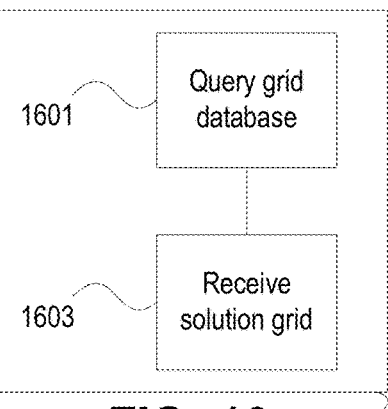
FIG. 16 illustrates a method of obtaining a solution grid according to one or more illustrative aspects described herein.

Alternatively, the puzzle generator may obtain a solution grid from a database of solution grids, as illustrated in FIG. 16. Initially, in step 1601, the puzzle generator queries a database 131 (FIG. 1) of solution grids based on any desired criteria, as discussed above with respect to FIG. 15. In step 1603 the puzzle generator receives a solution grid from the database, and proceeds to step 1403. Alternatively, the puzzle generator may query a database over a network, e.g., via an Internet database of crossword puzzle solution grids.

Once the solution grid has been identified, created, or otherwise obtained, then in step 1403 the puzzle generator divides the grid into pieces, e.g., as shown in grid 1705 in FIG. 17E. Any piece selection algorithm may be used. In the present example, the piece shapes shown in FIG. 10 are used. With this division process words may be split to lie on more than one puzzle piece. Such pieces may include word intersections and so can contain some of the letters of more than one word. In one embodiment, there are a finite variety of piece shapes such that the same shape pieces can occur multiple times within the puzzle. In one illustrative embodiment, there may be six (6) different piece shapes: 1×1 square (cyan in FIG. 2); 2×1 rectangle (green in FIG. 2); 3×1 rectangle (blue in FIG. 2); 2×2 ell (red in FIG. 2); 3×2 pyramid (yellow in FIG. 2); and 3×3 plus sign (magenta in FIG. 2). The configuration of these shapes on the solution grid defines the puzzle "layout".

Pieces may be displayed in different colors and/or shading, or may be displayed with bold outlines or other physical characteristics or shading to make it easier to identify each piece. Identically shaped pieces may be displayed with identical identifying characteristics, albeit with differing tile depictions. A representative sample of each piece is shown circled in FIG. 2 for identification purposes only, and are further shown in FIG. 10.

In step 1407 the puzzle generator randomizes the pieces by randomly mixing pieces of identical shape, e.g., as shown in grid 1706 in FIG. 17F. For each type of puzzle piece shape, some or all pieces of that shape are randomly exchanged in order to mix up the puzzle letters while maintaining the puzzle layout. In this process some pieces may require rotation in order to conform to the puzzle layout at their new location.

According to an illustrative aspect, when a piece is rotated the individual letters on their tiles on the piece rotate by an exact opposite amount within their tiles so as to cancel any letter rotation due to piece rotation thereby always maintaining upright legibility. This may be true for all cases of piece rotation within one embodiment described herein. In some embodiments, e.g., where each tile represents a part of an image like a jigsaw puzzle, rotation to maintain an upright orientation might not be desired.

In another embodiment, further mixing can be applied by rotating pieces that have more than 1 tile and whose shape exhibit rotational symmetry to new orientations such that the shape outline appears unchanged by the rotation, so as to conform to the puzzle layout. Such rotations may be referred to herein as "internal rotations". In the example shown in FIG. 17, there is one 3×3 plus sign shape, which the puzzle generator has also rotated internally to increase difficulty (based on the optional internal rotation feature being turned on).

Lastly, in step 1409, the randomized puzzle 1706 is presented to the user for interaction and solving as described herein.

Figure 3A:
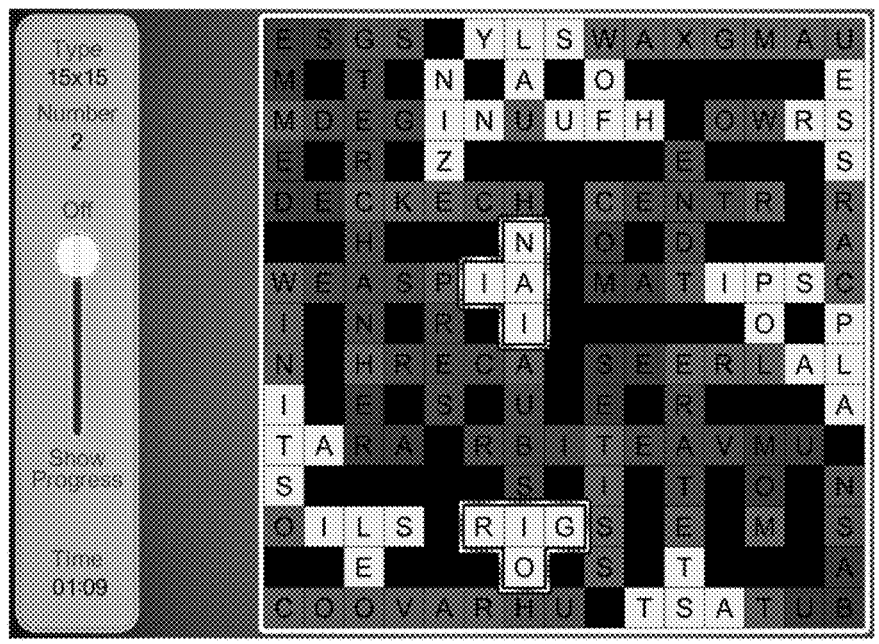
FIG. 3A-3C illustrate a piece swap feature according to one or more illustrative aspects described herein.

Puzzle Solving. The puzzle may be played by the player selecting a pair of identically shaped pieces. When a player selects the first piece of a pair, all the pieces of the same shape in the puzzle may be highlighted to enhance the visibility of the candidates for the choice of the second piece of the pair (FIG. 3A). Once a second piece is selected, the pieces in this pair are automatically swapped into each other's location, as shown in FIG. 3B-3C.

Figure 3B:
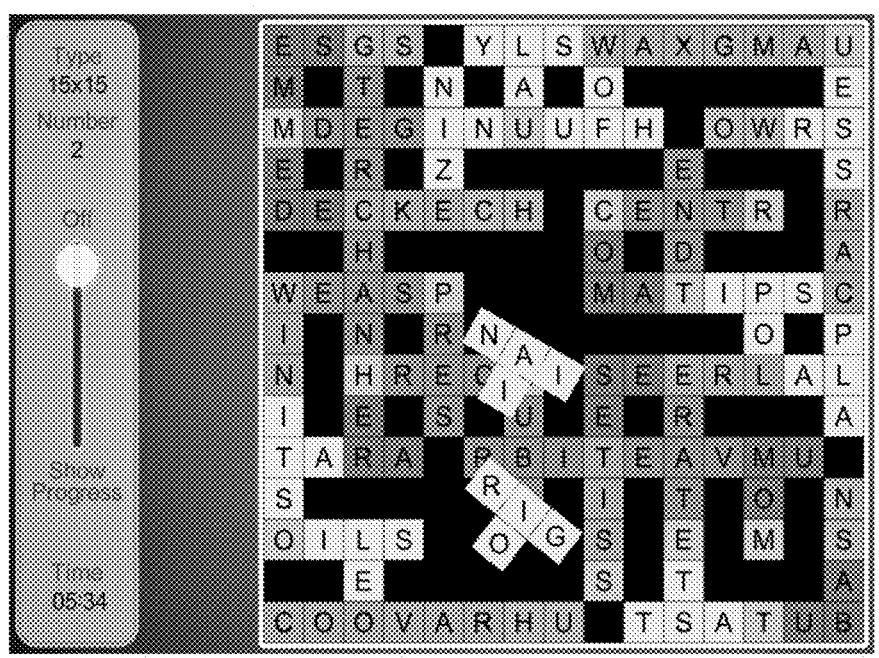
Figure 3C:
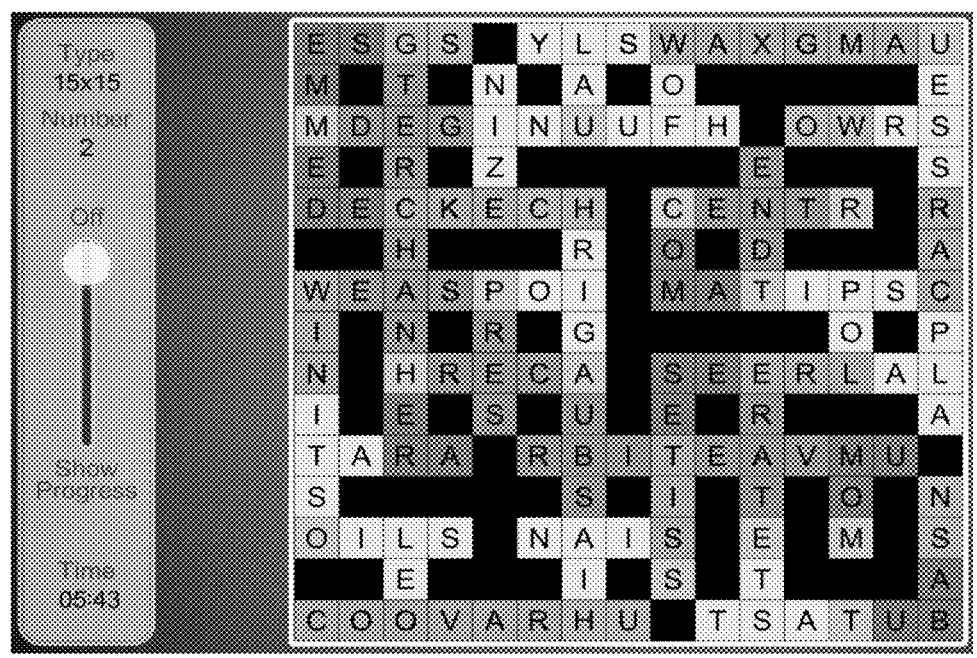
Figure 4:
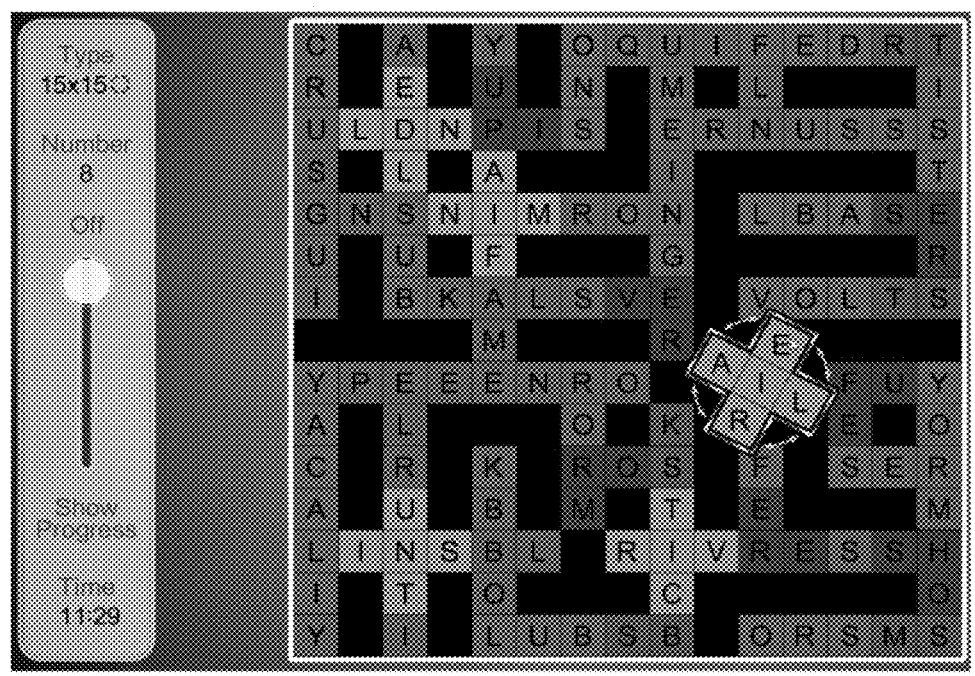
FIG. 4 illustrates an internal rotation feature according to one or more illustrative aspects described herein.

If a piece shape needs to be rotated in order to conform to the puzzle layout at its new location then this may be done automatically as in the example of FIG. 3A-3C. If the puzzle is one that incorporated internal rotations during creation and the shape exhibits rotational symmetry then the player can optionally select and then manually rotate the piece, as shown in FIG. 4. Such internal rotation feature may be turned on or off to effect a desired difficulty level by either the software developer or the player, or may be preset to on or off based on the selected grid.

The player continues until the original solution is reconstructed. Once this happens the puzzle may change its graphical appearance to show it is finished, e.g., transitioning to black and white, similar to a conventional crossword puzzle.

Figure 5:
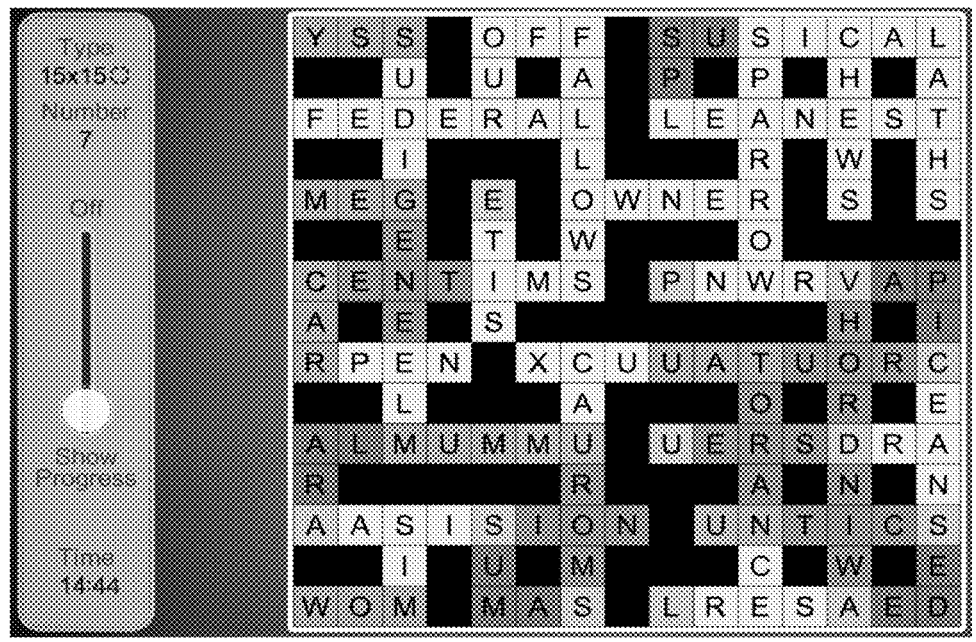
FIG. 5 illustrates a progress check/affirmation feature according to one or more illustrative aspects described herein.

Progress affirmation is optionally available to the player during play and is a form of help. With affirmation switched on then where pieces are in the correct position and orientation and they depict a correctly constructed solution puzzle word, those pieces may adopt a graphical appearance to indicate completion (e.g. appear black and white) and those pieces may be unselectable for future exchanges (FIG. 5). Those pieces are deemed to be "completed". Once a piece is completed, it may remain visibly so for the rest of the play even if affirmation is switched off again. If a correct puzzle word is constructed at the correct location but some or all of the pieces of that puzzle word differ from the correct solution pieces in terms of other letters on the pieces not contained within the puzzle word, then the pieces of that puzzle word are not shown as completed. Instead, affirmation may show that the puzzle word is correct by highlighting its letters, but only while affirmation is turned on.

The player may choose to update the completion status of the puzzle from time to time during play by switching on affirmation momentarily or have it on continuously for maximum help. When doing a time challenge the affirmation may be controlled automatically.

Figure 6:
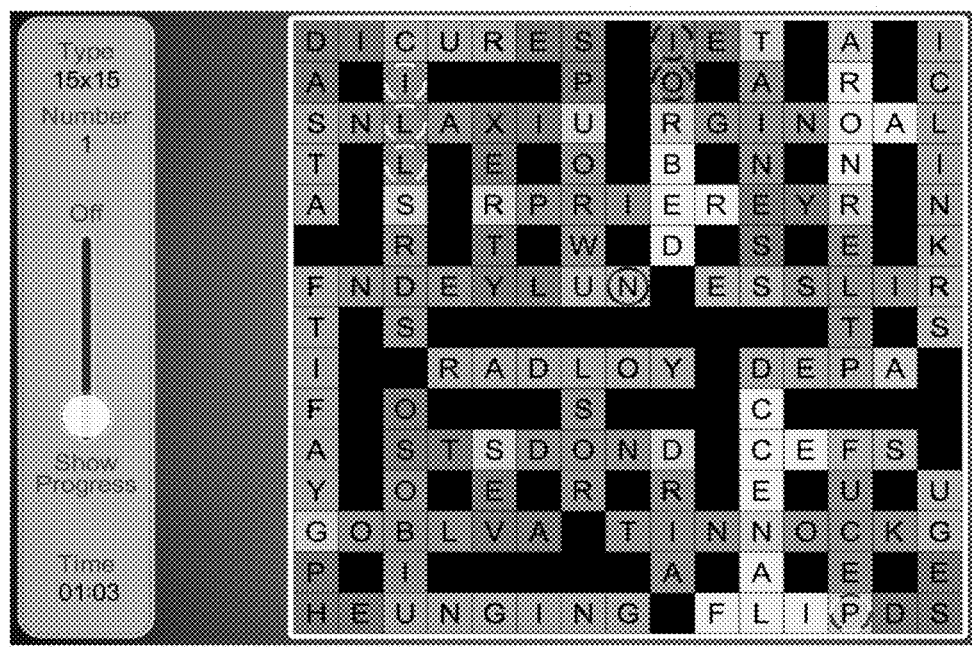
FIG. 6 illustrates a hint feature according to one or more illustrative aspects described herein.

In another aspect, a hint can be achieved by highlighting all the letters of a single solution puzzle word on the appropriate pieces wherever they happen to be (FIG. 6). Each time a hint is used, then another hint may become available. Alternatively, a user may only be allocated a certain number of 0 or more hints.

Scoring may be determined based on the degree to which the player made use of affirmation and hints during play in arriving at the solution. Alternatively a time challenge can be achieved by completing the puzzle against the clock under predefined or otherwise repeatable conditions, e.g., a fixed number of allowable hints, affirmation automatically occurring continuously, affirmation momentarily occurring when predefined amounts of the puzzle have been completed (e.g., based on word completion, percentage of letters correct, percentage of words correct, etc.), no affirmation, etc. However, any desired scoring structure or system may be used.

Figure 7:
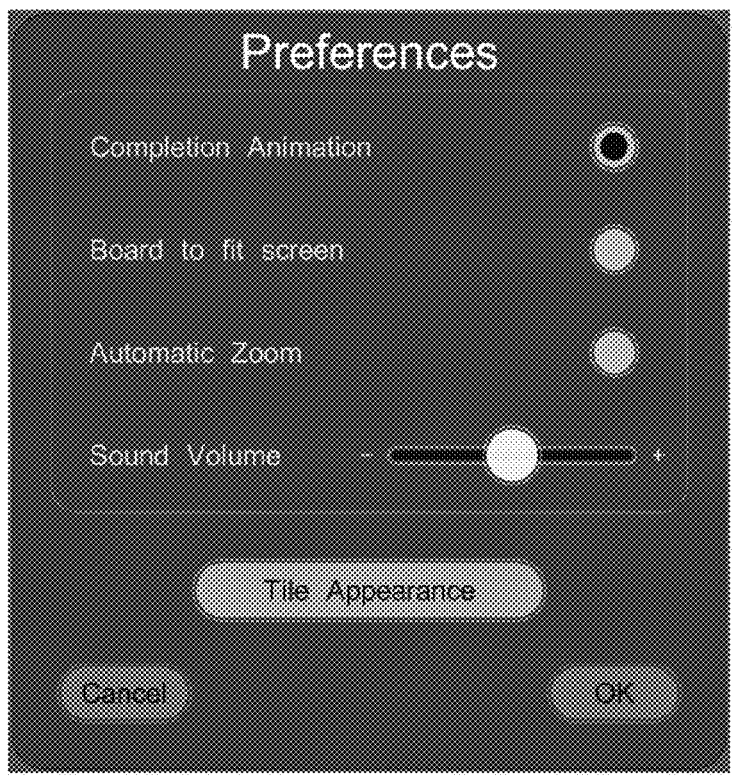
FIG. 7 illustrates a preferences screen according to one or more illustrative aspects described herein.

FIG. 7 illustrates a sample preferences screen through which a user can alter the puzzle's appearance, sound, animations, screen size, zoom level, and the like.

Figure 8:
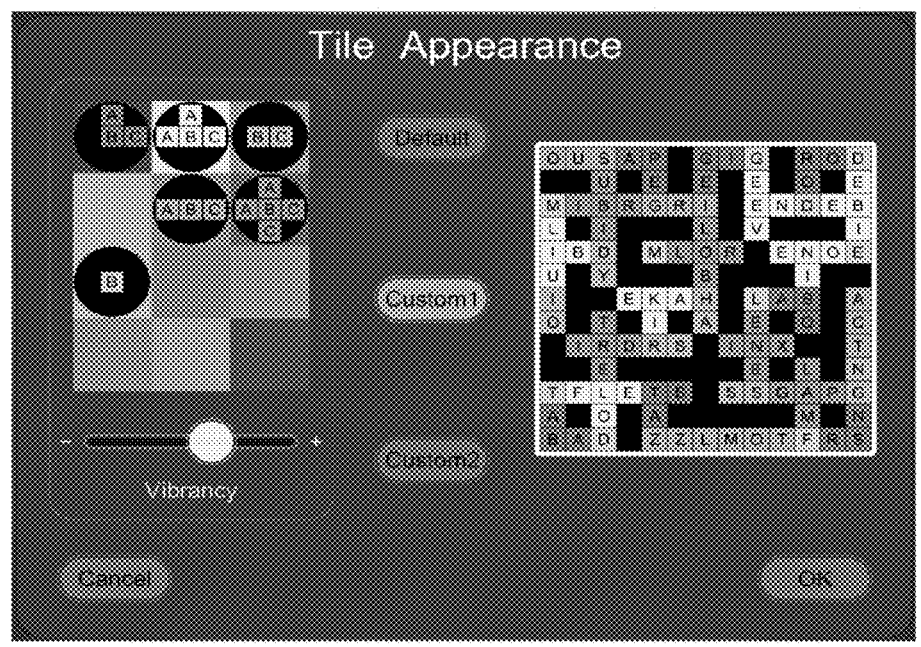
FIG. 8 illustrates a tile appearance customization screen according to one or more illustrative aspects described herein.

FIG. 8 illustrates a sample piece/tile appearance adjustment screen, through which a user can change the color saturation (vibrancy) and hues used for each puzzle piece shape, and may also be able to save one or more color schemes. For example, a color-blind user may desire a different color scheme than that of a non-color-blind user. The puzzle may also include preset color schemes for the user to select.

While a single player mode is described above, the puzzle may also be played in a multiplayer mode to increase each user's incentive to play fast and enhance skills. In one embodiment or mode, two players might play the same puzzle, and whoever completes the puzzle in the shortest amount of time wins, or whoever completes the highest percentage of the puzzle before time runs out wins. In this variation, puzzles may be played synchronously or asynchronously in real time or not real time.

In another embodiment or mode, during each turn a player may get a predetermined number of moves, e.g., 3. Then the next player gets 3 turns, and so forth. Similar to playing with affirmation on, any completed pieces may be associated with the player that moved them into their correct location, and optionally displayed as such (e.g., a unique color per player). When the puzzle is completed, whichever player has placed the most tiles into their respective correct locations wins the game, thereby providing an incentive to place larger pieces (having more tiles) before smaller ones. The total number of pieces placed could alternatively be used in yet another alternative variation. In these variations, the players share the same puzzle board/grid.

In still another variation, whenever one player correctly places a predetermined number of pieces in their correct location, e.g., 4 correctly placed pieces, then one or more of the other player's pieces are randomly moved. Another option is to only randomly move correctly placed pieces or to only randomly move incorrectly placed pieces on the other player's puzzle grid. In this variation, puzzles may be played on the same or different game boards/grids.

Figure 18:
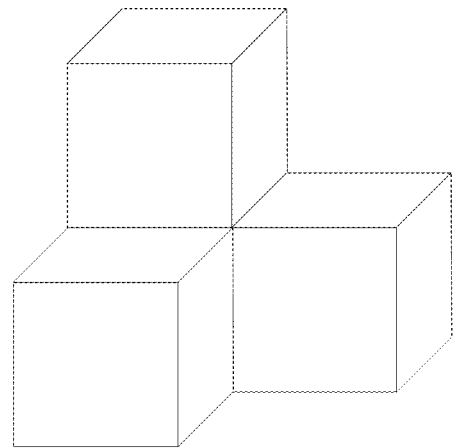
FIG. 18 illustrates a three-dimensional puzzle piece according to one or more illustrative aspects described herein.
Figure 19:
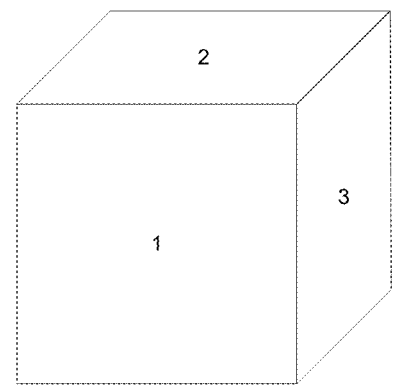
FIG. 19 illustrates a three-dimensional puzzle grid according to one or more illustrative aspects described herein.

The above variations have been described using a two-dimensional (2D) puzzle grid. However, it is also possible to construct a three-dimensional (3D) puzzle grid which uses 3D tiles (e.g., cubes, pyramids, etc.) and pieces, an example of which is shown in FIG. 18. In such a variation, a user may be able to rotate the puzzle grid around in three dimensions to view the different words, letter positions and intersections. A puzzle grid for such an embodiment may include six (6) planes, each on one side of a cuboid or similar object, e.g., as shown in FIG. 19 (showing 3 of the 6 planes of a cuboid, the other three planes being opposite one of those shown). Each of the 6 planes may include a puzzle grid similar in style and structure to those shown in FIG. 2. Any tiles on an edge of the puzzle grid may be included within the grid on each of the planes intersecting that edge. In still another embodiment, a full 3D grid may include internal tiles as well as tiles shown on the 6 planes.

Figure 20:
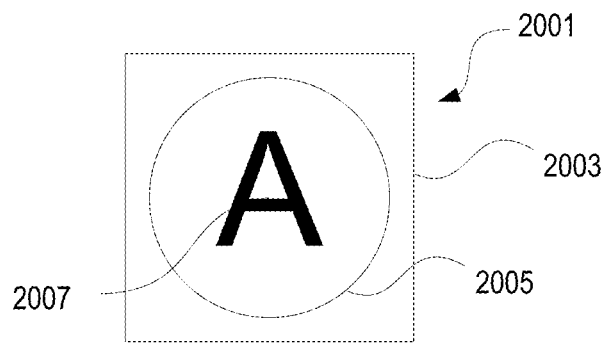
FIG. 20 illustrates a top view of a physical tile according to one or more illustrative aspects described herein.
Figure 21:
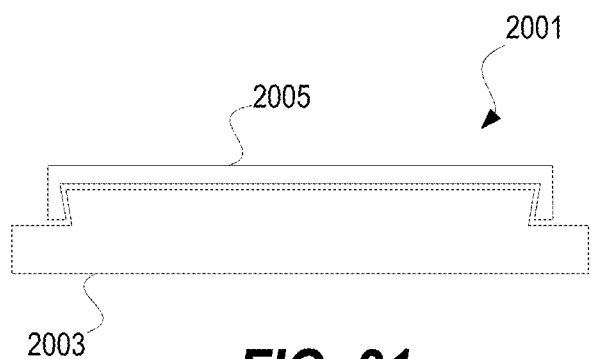
FIG. 21 illustrates a cross-section view of a physical tile according to one or more illustrative aspects described herein.

The features discussed above have primarily been with reference to software-based embodiments. However, another illustrative aspect may include physical puzzle pieces, discussed with reference to FIGS. 20-25. FIG. 20 illustrates a top view of a physical tile 2001, which may be comprised of a tile-shaped base 2003 (here a square) with a rotatable table 2005 displaying an individual character 2007 (here an "A"). FIG. 21 illustrates a cross sectional view of tile 2001, including tile-shaped base 2003 and rotatable table 2005. Tile 2001 may be made of a rigid yet slightly bendable material, e.g., plastic, such that table 2005 can snap onto base 2003, yet rotate freely once in place. Rotation of the table 2005 allows the displayed character 2007 to remain legible as the tile itself may be rotated on a physical puzzle board.

Multiple physical tiles 2001 may be placed together into the allowed puzzle shapes, e.g., as shown in FIG. 22 (4-tile pyramid 2201 shown as an example). The base of physical pieces may be indented, configured to have indentations 2301, or otherwise be configured, e.g., as shown in FIG. 23, to allow for secure placement on a puzzle board 2401 having slightly raised dividers 2403 between tile positions, as shown in FIG. 24. The outside edges of puzzle board 2401 may also have similar raised portions, may extend higher to visually indicate an edge of the board, or might not have a raised edge. In another variation, no raised dividers 2403 or edges may be needed, e.g., by including a magnet within each puzzle piece or tile, and corresponding magnet 2405 within or under each possible tile location on puzzle board 2401. One magnet 2405 is shown for illustration only.

Figure 25:
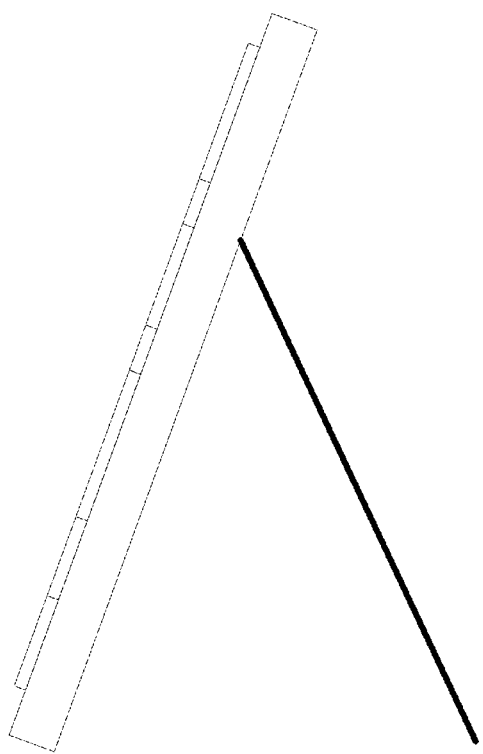
FIG. 25 illustrates a profile of a puzzle board with a kickstand support member extended to stabilize the puzzle board in an upright position.

As tiles are rotated when they are moved around the physical puzzle board 2401, it may be preferable that the character or image depicted on each tile table remain in an upright position. The movability of table 2005 on base 2003 allows a user to manually maintain characters/images in upright positions as tiles are moved. In one embodiment, a weight may be added or included within each table 2005 at the bottom of the character or image depicted on that tile table. This will help offset friction between the tile base and tile table, thereby aiding the automatic alignment of each tile's character/image as tiles are rotated and moved about the puzzle board when used in an upright position, e.g., as shown in FIG. 25.

The attachment of table 2005 to base 2003 as shown in FIG. 21 is for illustration only. Other attachment devices or techniques may be used that allow each character on a physical multi-tile puzzle piece to maintain upright legibility as the puzzle piece is rotated. Also, in some embodiments, blanks may be included to create the "dead space" between the rows and between the columns of letters, as shown in FIGS. 2-6.

Using the physical puzzle board and puzzle pieces described with respect to FIGS. 20-25 allows other educational, logic, and puzzle methods to be used in addition to those described above. For example, a fixed set of puzzle pieces may be provided having letters, numbers, characters, or images permanently fixed thereon, and a user may be requested to arrange the pieces to form as many words as possible. Alternatively, one user might randomly arrange the pieces, and then a second user might attempt to find as many words as possible, then vice versa, and the players compete for a high score.

In another example, specifically shaped pieces first may be placed according to a predefined pattern, but without any tables attached (i.e., only the bases 2003 are placed, e.g., as shown based on the shading in FIG. 17F). Next a user might be requested to snap on tables 2005 with characters according to a second pattern depicting a puzzle in a predefined randomized setup, e.g., as shown in FIG. 17F. Once the randomized puzzle is set up on the physical board, the user may then attempt to swap and rotate pieces to solve the puzzle, as shown in FIG. 17E.

Figure 26:
FIG. 26 illustrates a seeding feature according to one or more illustrative aspects described herein.

With reference to FIG. 26, one or more illustrative seeding features may be used to accommodate varying difficultly levels, either in physical and/or software-based embodiments. When seeding is used, one or more pieces may be pre-positioned (aka, seeded) in its respective correct position, thereby reducing the number of pieces that must be moved and/or rotated to solve a given puzzle. As shown in FIG. 26, seeded pieces may be colored differently, e.g., white (similar to correctly placed pieces as shown in FIG. 5), to indicate to the user that those particular pieces are in their respective correct locations.

Different numbers or amounts of pieces may be seeded based on a difficulty level of a particular puzzle, a game mode, as selected by a user, or based on any other difficulty-based setting. For example, in an easy mode of play, a high percentage of pieces may be seeded; in a normal/medium difficulty mode of play, a lesser percentage of pieces may be seeded; and in a hard mode of play, an even lesser percentage (or even zero-percent) of pieces may be seeded. In one illustrative embodiment, 30%, 15%, and 0% of pieces may be seeded in easy, medium, and hard modes of play, respectively. More or fewer than three modes of play may be used, and percentages other than 30%, 15% and 0% may be used, based on a desired level of difficulty and a size of the game board for a particular puzzle. The number of seeded pieces for a particular puzzle might be any integer value from 0 to 2 less than the total number of pieces in a particular puzzle, but optimally is less than 50% of the total number of pieces unless an extremely easy or beginner mode of play is desired.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying a solution grid for a field of play, wherein the solution grid comprises a plurality of words;
   dividing the solution grid into a plurality of pieces, each conforming to one of a plurality of predefined piece shapes, wherein each piece shape comprises one or more tiles, wherein each tile contains one letter, wherein at least a plurality of words span across more than one piece, and wherein the plurality of pieces form a puzzle layout;
   identifying a set of locations corresponding to each piece shape;
   creating a shuffled grid by shuffling at least two or more identically shaped pieces among the set of locations identified for that piece shape in the solution grid, while maintaining the puzzle layout;
   outputting the shuffled grid for display to a user;
   receiving user input identifying a pair of identically shaped pieces;
   swapping the pair of identically shaped pieces responsive to the user input;
   outputting a revised grid depicting that the pair of identically shaped pieces has been swapped responsive to the user input; and
   responsive to determining that the revised grid does not match the solution grid, repeating the receiving, swapping, and outputting steps until the revised grid matches the solution grid.

2. The method of claim 1, wherein creating the shuffled grid further comprises rotating one or more multi-tile pieces whose shape exhibits rotational symmetry such that the shape outline appears unchanged by the rotation and the method further comprises rotating a piece with a shape that exhibits rotationally symmetry responsive to the user input.

3. The method of claim 1, wherein each tile is square, and wherein the predefined number of different piece shapes comprise a 1-tile square, a 2-tile rectangle, a 3-tile rectangle, a 3-tile ell, a 4-tile pyramid, and a 5-tile plus sign.

4. The method of claim 1, further comprising identifying, responsive to the user input, at least correctly placed tiles upon which a solution puzzle word has been correctly recreated.

5. The method of claim 4, further comprising locking in place correctly placed pieces.

6. The method of claim 1, further comprising identifying, responsive to second user input, a set of tiles forming a particular word in the solution grid, regardless of a present location of each tile of the particular word, wherein pieces corresponding to each identified tile are usable to form the particular word in the solution grid.

7. The method of claim 1, wherein swapping the pair of identically shaped pieces responsive to the user input further includes:
   receiving a first user input selecting a first piece;
   displaying a visual sign identifying one or more pieces other than the first piece, wherein the one or more pieces each has an identical shape with the first piece;
   receiving a second user input selecting a second piece among the identified one or more other pieces; and
   swapping the first piece and the second piece.

8. The method of claim 1, wherein creating the shuffled grid further comprises ensuring that at least a predetermined amount of pieces or tiles are in a respective same location on the shuffled grid as each is located on the solution grid, and wherein the predetermined amount of piece are displayed using a visual appearance indicating each is correctly located.

9. The method of claim 8, wherein the predetermined amount varies among a plurality of different difficulty levels.

10. One or more nontransitory computer readable media storing computer readable instructions that, when executed by a processor, cause a system to perform:
    identifying a solution grid for a field of play, wherein the solution grid comprises a plurality of words;
    dividing the solution grid into a plurality of pieces, each conforming to one of a plurality of predefined piece shapes, wherein each piece shape comprises one or more tiles, wherein each tile contains one letter, wherein at least a plurality of words span across more than one piece, and wherein the plurality of pieces form a puzzle layout;
    identifying a set of locations corresponding to each piece shape;
    creating a shuffled grid by shuffling at least two or more identically shaped pieces among the set of locations identified for that piece shape, while maintaining the puzzle layout;
    outputting the shuffled grid for display to a user;
    receiving user input identifying a pair of identically shaped pieces;
    swapping the pair of identically shaped pieces responsive to the user input;
    outputting a revised grid depicting that the pair of identically shaped pieces has been swapped responsive to the user input; and
    responsive to determining that the revised grid does not match the solution grid, repeating the receiving, swapping, and outputting steps until the revised grid matches the solution grid.

11. The computer readable media of claim 10, wherein creating the shuffled grid further comprises rotating one or more multi-tile pieces whose shape exhibit rotational symmetry such that the shape outline appears unchanged by the rotation and wherein the instructions further cause the system to perform rotating a piece whose shape exhibits rotational symmetry responsive to user input.

12. The computer readable media of claim 10, wherein each tile is square, and wherein the predefined number of different piece shapes comprise a 1-tile square, a 2-tile rectangle, a 3-tile rectangle, a 3-tile ell, a 4-tile pyramid, and a 5-tile plus sign.

13. The computer readable media of claim 10, further comprising identifying, responsive to the user input, at least correctly placed tiles upon which a solution puzzle word has been correctly recreated.

14. The computer readable media of claim 13, further comprising locking in place correctly placed pieces.

15. The computer readable media of claim 10, wherein the instructions, when executed, further cause the system to perform identifying, responsive to second user input, a set of tiles forming a particular word in the solution grid, regardless of a present location of each tile of the particular word, wherein pieces corresponding to each identified tile are usable to form the particular word in the solution grid.

16. The computer readable media of claim 10, wherein creating the shuffled grid further comprises ensuring that at least a predetermined amount of pieces or tiles are in a respective same location on the shuffled grid as each is located on the solution grid, and wherein the predetermined amount of piece are displayed using a visual appearance indicating each is correctly located.

17. The computer readable media of claim 16, wherein the predetermined amount varies among a plurality of different difficulty levels.

18. The computer readable media of claim 10, wherein swapping the pair of identically shaped pieces responsive to the user input further includes:
receiving a first user input selecting a first piece;
displaying a visual sign identifying one or more pieces other than the first piece, wherein the one or more pieces each has an identical shape with the first piece;
receiving a second user input selecting a second piece among the identified one or more other pieces; and
swapping the first piece and the second piece.

19. A system comprising:
a plurality of tiles, wherein each tile depicts a subset of a concept, and wherein each tile comprises:
  a base portion, and
  a table portion concentrically attachable to the base portion and displaying the represented subset of the concept, wherein the table portion is rotatable about the base portion to display the subset of the concept in substantially any direction on a two dimensional plane;
a plurality of different puzzle pieces each configured in one of a predefined number of different piece shapes, wherein each different piece shape comprises one or more contiguous tiles, wherein a plurality of different piece shapes comprise two or more tiles, and wherein multiple pieces of the plurality of different piece shapes that comprise two or more tiles include at least two different tiles; and
a field of play in which the plurality of puzzle pieces may be arranged to form a plurality of complete concepts using the plurality of different puzzle pieces, wherein at least some of the complete concepts span multiple puzzle pieces when the puzzle is solved.

20. The system of claim 19, wherein each complete concept is a different word, and wherein each tile depicts a letter.

21. The system of claim 19, wherein each tile is square, and wherein the predefined number of different piece shapes comprise a 1-tile square, a 2-tile rectangle, a 3-tile rectangle, a 3-tile ell, a 4-tile pyramid, and a 5-tile plus sign.

\* \* \* \* \*